No. 752,372. PATENTED FEB. 16, 1904.
H. E. BERKEY.
FASTENING DEVICE.
APPLICATION FILED MAY 11, 1903.
NO MODEL.
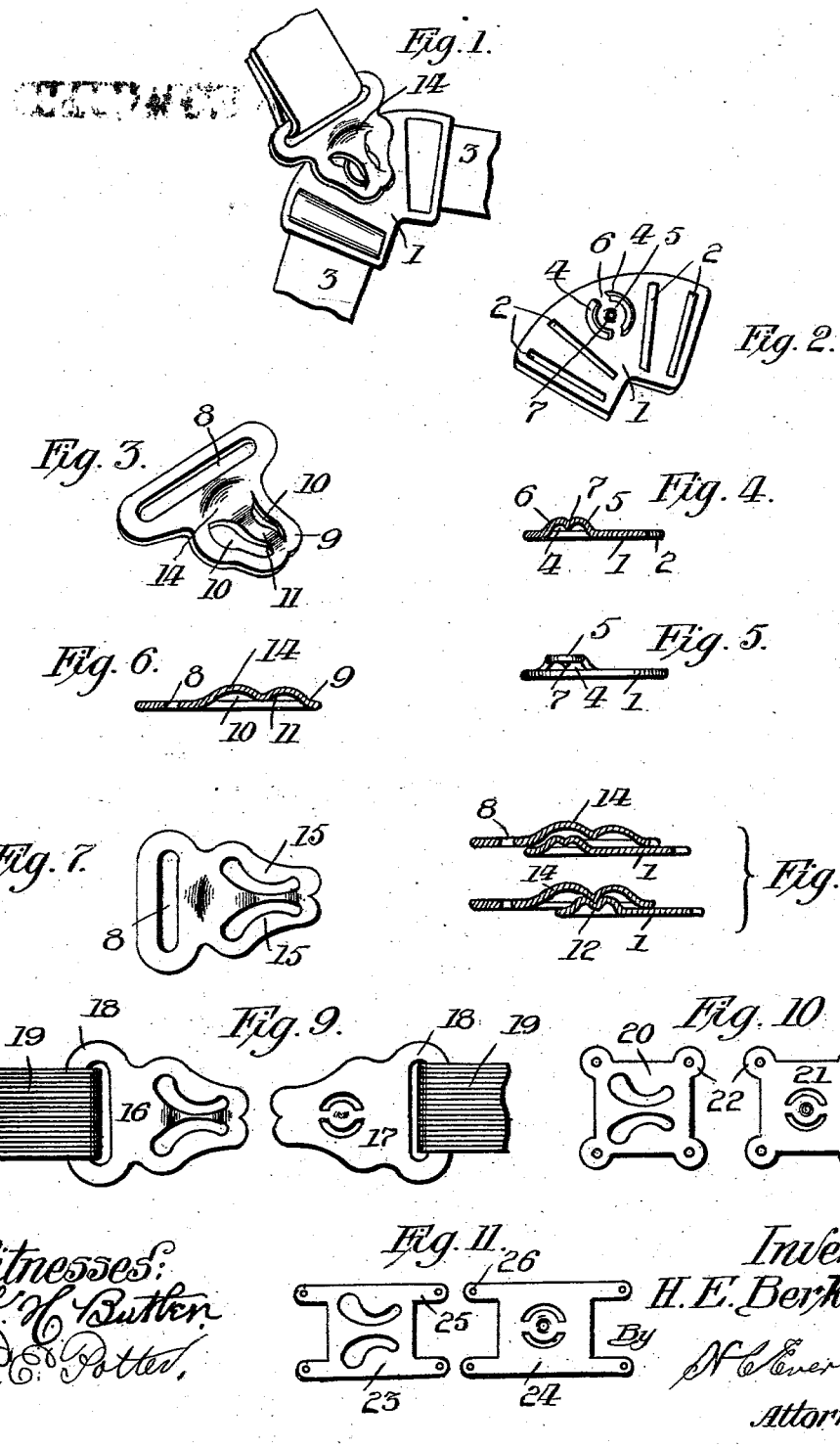

No. 752,372.

Patented February 16, 1904.

UNITED STATES PATENT OFFICE.

HARVEY E. BERKEY, OF MONONGAHELA, PENNSYLVANIA.

FASTENING DEVICE.

SPECIFICATION forming part of Letters Patent No. 752,372, dated February 16, 1904.

Application filed May 11, 1903. Serial No. 156,588. (No model.)

*To all whom it may concern:*

Be it known that I, HARVEY E. BERKEY, a citizen of the United States of America, residing at Monongahela, in the county of Washington and State of Pennsylvania, have invented certain new and useful Improvements in Fastening Devices, of which the following is a specification, reference being had therein to the accompanying drawings.

This invention relates to certain new and useful improvements in fastening devices, such as are ordinarily employed in garment-supporters and analogous devices; and the invention has for its object to construct a device of this kind which may be advantageously used in connection with many articles of personal wear, such as suspenders, belts, hose-supporters, and the like.

My invention consists in the employment of two members, one of which has a stud or head and the other of which has a catch adapted to engage with the stud or head; and the object of the invention is to construct a device of this character in which the catch member will be securely fastened to the other member and a device in which the two members when fastened together will lie so closely to a flat position as to not impart any discomfort whatever to the wearer, all of which will be hereinafter specifically described, and particularly pointed out in the claim.

A further object of the present invention is to construct a device of this character which may be used in connection with garment-supporters or the like of various descriptions, the connection between the two members being substantially the same in all constructions to which the device may be adapted.

In describing the invention in detail, reference is had to the accompanying drawings, forming a part of this specification, and wherein like numerals of reference indicate like parts throughout the several views, in which—

Figure 1 is a plan view, partly in perspective, showing the construction of the device as employed for a hose-supporter. Fig. 2 is a detail perspective view of the headed member of the fastener. Fig. 3 is a like view of the catch member. Fig. 4 is a cross-sectional view of the headed member. Fig. 5 is a side elevation of the same. Fig. 6 is a cross-sectional view of the catch member. Fig. 7 is a top plan view of the catch member. Fig. 8 shows two sectional views of the members, illustrating the members when placed in position for fastening and also fastened. Fig. 9 is a top plan view showing the fastener as adapted for use in the belt or the like. Fig. 10 is a like view showing the fastening as adapted for a hook and eye. Fig. 11 is a like view showing the fastener as constructed and particularly adapted for use in connection with ladies' dress-skirts, pantaloons, or the like.

As shown in Figs. 1 to 8, inclusive, the fastening comprises a plate member 1 of a somewhat triangular shape, being provided adjacent its ends with slots 2, which are adapted to receive a tape or band 3, forming a part of the hose-supporter. This plate member 1 is provided centrally of the length of its longest arc with segment-shaped slots 4, placed so as to be within the bounds of a circle, the material 5 between these segment-shaped slots being connected to the top of the plate by necks 6. A disk or head 5 is forced out beyond the plane of the upper face of the plate member 1 and is provided centrally of its upper face with a small depression 7. The catch member embodies a loop or eye 8, provided with an extension or lug 9, which extension or lug has slots 10 therein forming a tongue 11, adapted to lie over the top of the head or button 5, as seen in Fig. 1 of the drawings, and provided with a depression 12 forming a small head or stud which is adapted to engage in the depression 7 in the upper face of the head or button 5. The inner portion of the lug 9 and the adjacent portion of the loop 8 are formed on their under faces with concave portion 14, which is adapted to receive the head or button 5, as seen in Fig. 8 of the drawings, prior to engaging the two devices, the engagement being effected by placing the head or button 5 in the depression and then pulling outwardly on one member or the other, so as to engage the lips 15 of the lug 9 in under the head or button 5.

In Fig. 9 the construction of the device is similar in all respects in so far as the fastening is concerned and is particularly adapted for use on belts and the like. In said construction the members 16 17 are each provided with a loop 18 to receive the respective ends of the belt 19. The headed stud or button and also the catch are the same in construction, and the same reference-numerals have been applied thereto.

In Fig. 10 I show the device constructed as particularly adapted for use as a hook and eye and in this construction employ two plate members 20 21, respectively, provided at their corners with loops or eyes 22 to permit of the sewing of the hook member and eye member to the garment. The head or button and the catch are of the same construction as afore described. Also in Fig. 11 I show the device constructed as particularly adapted for use in connection with ladies' skirts and as a fastening for pantaloons and in this construction provide two plate members 23 24, respectively, provided at their ends with barbs 25, adapted to be inserted underneath the fabric, and each may be, if desired, provided with eyes 26 to permit of their being sewed or stitched in position. The headed stud or button and the catch member are of the same construction as afore described.

Various other ways of applying the invention and its adaptability to various devices in the nature of garment-fasteners or analogous devices will readily suggest themselves.

Having fully described my invention, what I claim as new, and desire to secure by Letters Patent, is—

A fastening device of the character described comprising two interlocking members, one of said members being provided with a head extending upwardly therefrom, provided in its upper face with a depression, said head having integral necks connecting the same with said member, said member being further provided with segmental slots formed therein, and the other of said members comprising a plate having a loop formed with a depression in its under face, an extended portion having slots therein formed integral with the loop, a tongue formed by the material between said slots, said material being bent upwardly from the said extended portion and being provided with a depression forming a lug on the under face thereof adapted to seat in the depression of the said stud, of the first-named member, said extended portion being further provided with a concave surface adapted to receive the head of the said stud, substantially as described.

In testimony whereof I affix my signature in the presence of two witnesses.

HARVEY E. BERKEY.

Witnesses:
Jas. W. Drape,
E. E. Potter.